United States Patent [19]
Vaughn

[11] Patent Number: 5,213,354
[45] Date of Patent: May 25, 1993

[54] COUPLING DEVICE FOR TOWING A VEHICLE
[75] Inventor: Eugene C. Vaughn, Riverside, Calif.
[73] Assignee: Pro-Hitch, Inc., Claremont, Calif.
[21] Appl. No.: 785,985
[22] Filed: Oct. 31, 1991
[51] Int. Cl.⁵ .......................... B60D 1/06; B60D 1/40
[52] U.S. Cl. .................. 280/479.2; 280/477; 280/491.2
[58] Field of Search ............. 280/479.3, 479.2, 477, 280/482, 491.2, 491.3, 493, 494, 491.1, 478.1

[56] References Cited
U.S. PATENT DOCUMENTS

| | | | |
|---|---|---|---|
| 3,169,028 | 2/1965 | Scrivner | 280/479.2 |
| 3,820,822 | 6/1974 | Henderson | 280/479.2 |
| 4,125,272 | 11/1978 | Putnam, Jr. et al. | 280/479.3 |
| 4,134,602 | 1/1979 | Boger | 280/479.2 |
| 4,893,829 | 1/1990 | Davis | 280/479.2 |
| 5,009,446 | 4/1991 | Davis | 280/479.3 X |

Primary Examiner—Margaret A. Focarino
Assistant Examiner—Kevin Hurley
Attorney, Agent, or Firm—Kelly, Bauersfeld & Lowry

[57] ABSTRACT

A base member for attachment to a vehicle to be towed comprising elongate upwardly converging guide walls of equal length to slidably receive a drawbar therebetween for movement between retracted and advanced positions relative to the base member. The drawbar has a socket element at its forward end for coupling with a ball member on a towing vehicle and a sliding pivot pin at its rear end for guiding the drawbar along the length of the guide walls and permitting swinging of the drawbar laterally to position the socket element in alignment with the ball member without having to maneuver the towed or towing vehicle. The sliding pivot pin snaps into notches in the base member when the drawbar is moved into its retracted position to lock the drawbar in driving relation to the base member.

16 Claims, 3 Drawing Sheets

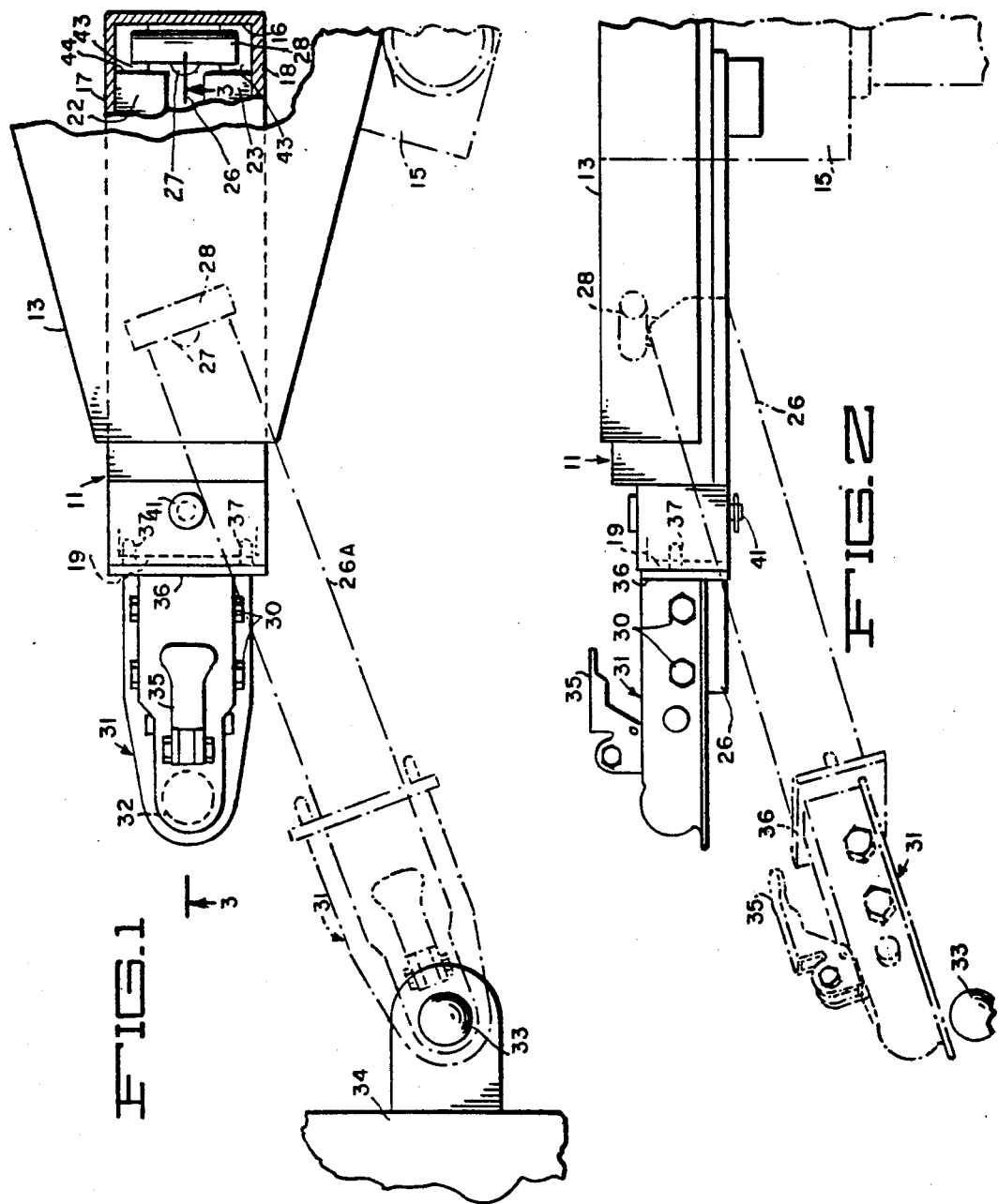

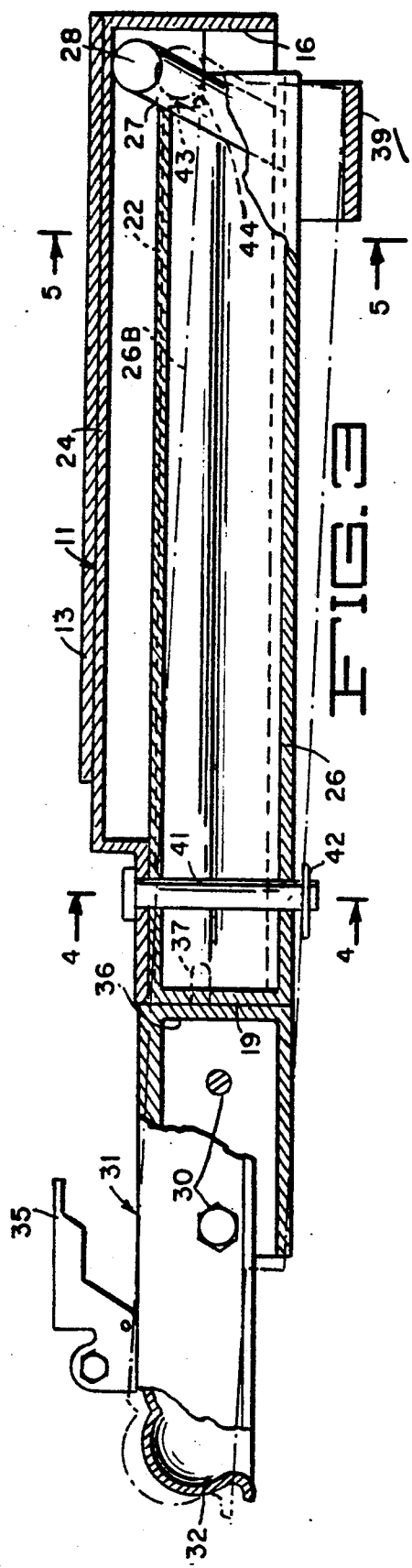
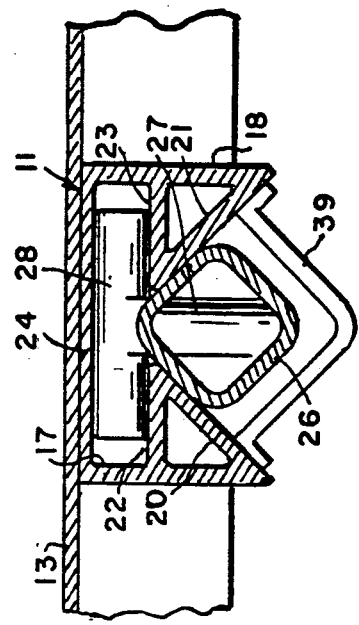
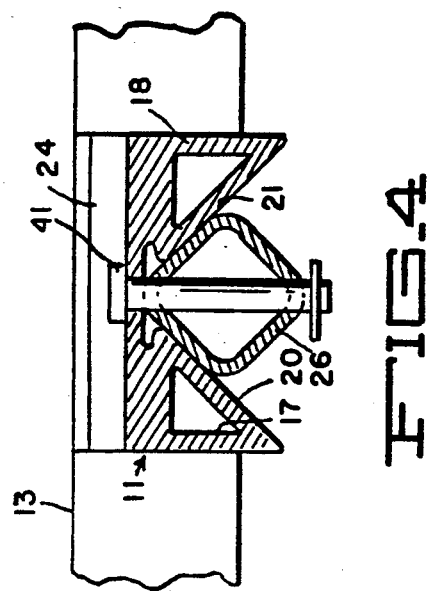

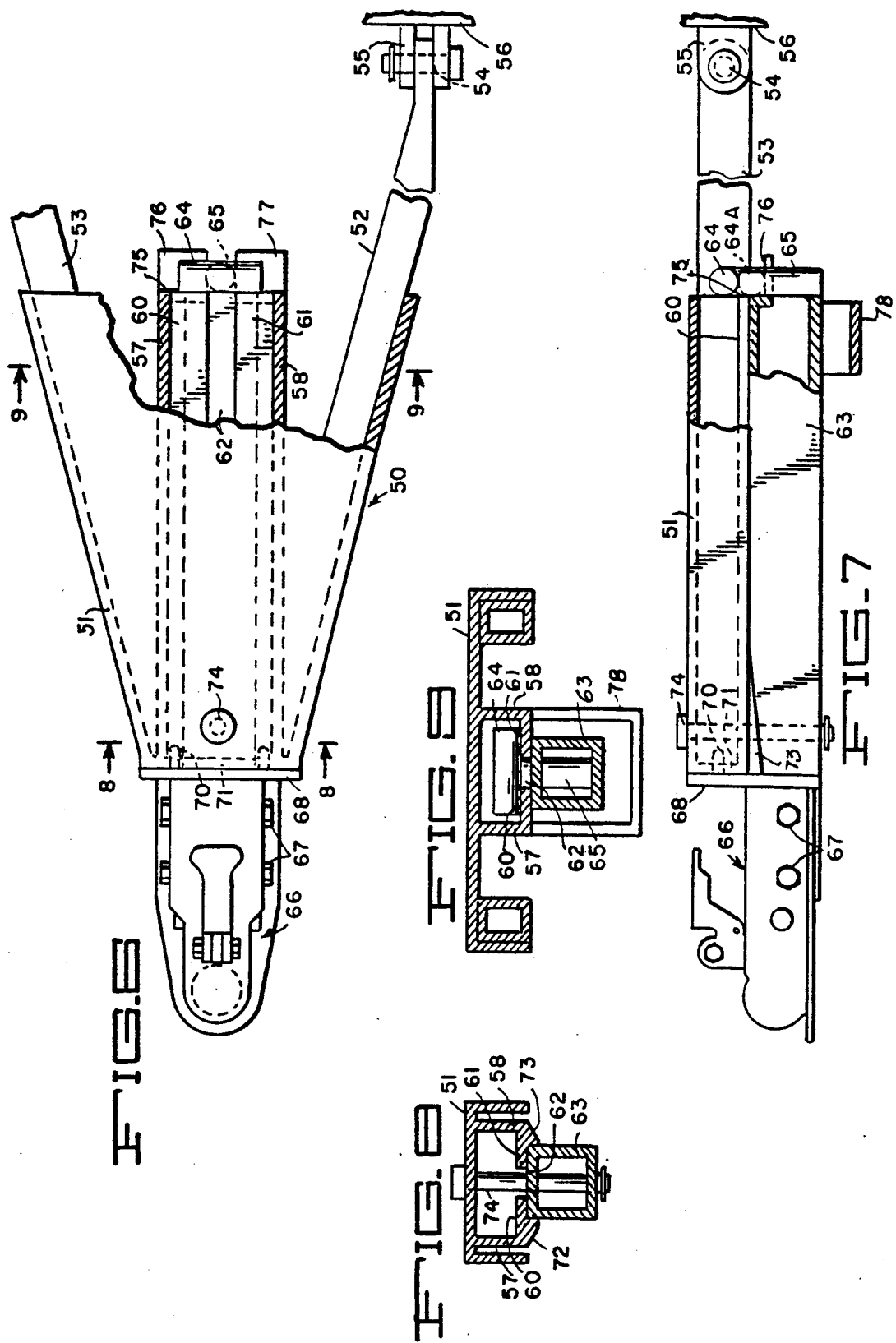

COUPLING DEVICE FOR TOWING A VEHICLE

BACKGROUND OF THE INVENTION

1. Field of the Invention

This invention relates to a device for coupling a towing vehicle to a towed vehicle such as a trailer or the like.

2. Description of the Prior Art

Generally, coupling devices of the above type comprise a ball member connected to the towing vehicle and a socket member connected to the towed vehicle. It is necessary to precisely align the ball and the socket with each other in order to effect coupling. Although this may be easily accomplished when coupling a lightweight trailer or the like to a towing vehicle, where the towed vehicle can be easily maneuvered into position, it requires strenuous exertion to manually maneuver a relatively heavy towed vehicle to accurately align the socket with the ball for coupling. Although the towing vehicle can be maneuvered into position under power to effect such coupling when the towed vehicle is stationary, the driver normally can not see the ball and socket members while controlling the towing vehicle and thus must generally proceed by trial and error until proper alignment is made.

SUMMARY OF THE INVENTION

A principal object of the present invention is to provide a coupling device of the above type in which the ball and socket members can be readily coupled without having to maneuver either the towing or the towed vehicle during the process.

Another object of the invention is to provide a coupling device of the above type which requires a minimum amount of manual exertion to effect coupling of the ball and socket members.

A related object of the invention is to provide a coupling device of the above type in which the towed and towing vehicles may be quickly and easily coupled together.

Still another object of the invention is to provide a coupling device of the above type which is rugged and capable of use for the towing of relatively heavy vehicles.

Another object of the invention is to provide such a coupling device which is compact and of relatively few parts.

A further object of the invention is to provide such a coupling device of simple construction which is economical to manufacture.

BRIEF DESCRIPTION OF THE DRAWINGS

The manner in which the above and other objects of the invention are accomplished will be readily understood from the following description considered in conjunction with the accompanying drawings, wherein:

FIG. 1 is a plan view of a coupling device embodying a preferred form of the present invention and showing the same interconnecting a towing vehicle and a towed vehicle such as a two-wheel trailer having a single axle.

FIG. 2 is a side elevational view of the coupling device.

FIG. 3 is an enlarged longitudinal sectional view of the coupling device, taken along line 3—3 of FIG. 1.

FIG. 4 is a transverse sectional view of the device, taken along line 4—4 of FIG. 3.

FIG. 5 is another transverse sectional view, taken along line 5—5 of FIG. 3.

FIG. 6 is a plan view of an alternative embodiment of the coupling device, showing the same associated with a towed vehicle, such as a four-wheel automobile having more than one axle.

FIG. 7 is a side view, partly in section, of the embodiment of FIG. 6.

FIG. 8 is a transverse sectional view of the FIG. 6 embodiment, taken along line 8—8 of FIG. 6.

FIG. 9 is a transverse sectional view thereof, taken along line 9—9 of FIG. 6.

DESCRIPTION OF THE PREFERRED EMBODIMENT

While this invention can be embodied in many different forms, there are shown in the drawings two alternative embodiments. It should be understood, however, that the present disclosure is to be considered only as an exemplification of the principles of the invention and is not intended to limit the invention to the embodiments illustrated. The scope of the invention is limited only by the language of the appended claims.

Referring to FIG. 1 through 5, the coupling device shown there comprises an elongate base member 11 integrally attached to a triangular frame plate 13 forming part of a towed vehicle (not shown). The vehicle may, for example, be a boat or house trailer supported mainly by a single wheeled axle wherein a significant portion of its weight is borne by its forward part, including the frame plate 13.

In cases where a relatively heavy towed trailer or the like is involved, a retractable jack, partly indicated by dot-dash lines 15, may be suitably attached to the frame plate 13 to support the forward end of the vehicle while not being towed and to raise and lower the same relative to ground level.

The base member 11 comprises a rear wall 16 integral with parallel side walls 17 and 18. The latter are formed integral with upwardly converging elongate guide walls 20 and 21 (FIG. 4 and 5) and with horizontal shelf walls, 22 and 23, respectively. The shelf walls are integrally connected with the upper edges of the guide walls 20 and 21. A top wall 24 is formed integral with the side walls 17 and 18 to yield a rigid structure which is partly closed at its forward end by a wall 19.

A hollow drawbar 26 is provided which is generally square in cross section and positioned with its sides extending at 45 degrees to the horizontal, as seen in FIG. 4 and 5, to nest between the inclined walls 20 and 21.

It will be noted that the upper edges of the walls 20 and 21 are spaced apart to form a guideway for a short inclined post 27 which is integrally united with the rear end of the drawbar 26 and with a cylindrical pivot pin 28 extending transversely to the length of the runway. The pivot pin 28 is rockable and slidable along the shelf walls 22 and 23.

The forward end of the drawbar 26 is attached by bolts 30 to a socket member 31 forming a spherical socket 32 which is adapted to fit over a ball member 33 mounted on the rear portion of a towing vehicle partly indicated at 34 (FIG. 1).

The socket member 31 may be of conventional construction, including a locking lever 35 which may be manipulated to lock the member, in a manner not shown, in coupling and swivelling engagement with the ball member 33 after the parts have been properly aligned to interfit the socket with the ball.

A cross plate 36 is formed integral with the drawbar 26 at the rear of the socket member 31 and carries a pair of locating pins 37 adapted to fit within holes in the wall 19 when the drawbar 26 is in the retracted position shown in full lines in FIGS. 1 and 3 to prevent lateral movement of the forward end of the drawbar relative to the base member 11. Also, a removable safety lock pin 41 is passed through co-extensive openings in the top wall 24 and the drawbar 26 to lock the drawbar in its retracted position. A suitable spring retainer clip 42 is provided to retain the safety lock pin 41 in place. A V-shaped retainer member 39 is extended between the rear ends of the inclined walls 20 and 21 to restrict downward movement of the rear end of the drawbar 26 when it is in its retracted position.

When it is desired to couple a towed vehicle to the towing vehicle 34, either vehicle is maneuvered until the ball member 33 is located in the general vicinity of the socket 32, as depicted in FIG. 1 and 2. The forward end of the towed vehicle is then raised, for example by jack 15, until the socket member 31 is located well above the level of the ball member 33. The safety lock pin 41 is removed, allowing the drawbar 26 to be slid forward with pin 28 sliding along shelf walls 22 and 23 and then rocked downwardly about the pivot formed by pin 28. Thus, the drawbar is removed from nesting engagement with the surfaces of the inclined side walls 20 and 21 of the base member 11. Also, the drawbar is permitted to swing in a horizontal direction, as depicted by dot-dash lines 26A in FIG. 1, as well as move endwise to readily align the socket 32 with the ball member 33, and thereby effect coupling. Thereafter, the jack 15 may be retracted or the towed vehicle otherwise lowered. At such time, the downward force due to the weight of the vehicle applied to the forward end of the frame plate 13 is opposed through engagement of the upper surface of the drawbar 26 with one or the other of the inclined guide walls 20 and 21, or with the lower edge thereof, while the pin 28 rests on the shelf walls 22 and 23. This will be effective to cam the base member 11 into nesting engagement with the drawbar 26 and thus align the towed vehicle with the towing vehicle.

Subsequently, the towing vehicle can be driven backward to slide the drawbar 26 and pin 28 into their fully retracted positions where the pin 28 will drop into notches 43 formed at the rear of the shelf walls 22 and 23, leaving the drawbar in its fully coupled position with the base member as indicated by lines 26B in FIG. 3. When safety lock pin 41 is reinserted in place and towing force exerted on the coupling, it will be applied through the drawbar 26 and pin 28 to the forward edge or shoulders 44 of the notches 43, and thence to the frame plate 13.

It will be noted from the foregoing that my improved coupling device enables persons of limited strength to readily and easily couple towing and towed vehicles together, regardless of their sizes and weights, with a minimum amount of exertion.

As an alternative to the illustrated arrangement, the base member (11) could, with obvious modification, be attached to the towing vehicle and the ball member (33) be attached to the towed vehicle.

If desired, when the vehicles are uncoupled, the drawbar 26 can be readily removed by merely swinging the same horizontally beyond its dot-dash position 26A shown in FIG. 1 until the pin 28 is aligned with the runway between the shelf walls 22 and 23, leaving the drawbar free to be withdrawn from the base member 11.

FIG. 6 to 9 illustrate a modified embodiment which may be advantageously used to tow automobiles or the like in which the entire weight of the towed vehicle is supported by the vehicle wheels. In this case, a V-shaped tow bar generally indicated at 50 is provided comprising a triangular frame plate 51 integrally united with rearwardly diverging struts 52 and 53 which are mounted at their rear ends for pivotal movement about a horizontal axis by pivot pins, one of which is shown at 54, attached to bosses mounted on a forward part 56 of the towed vehicle. The tow bar 50 is relatively light in weight so that its forward end can normally be raised by a person of average strength.

Spaced depending side walls 57 and 58 are formed integral with the frame plate 51 and horizontally extending shelf walls 60 and 61 are formed integral with the side walls to form base means with an elongate guideway 62 therebetween. A drawbar 63 of square cross section is provided to slidably fit against the undersides of the shelf walls 60 and 61. A pivot slide pin 64, similar to pin 28 of FIG. 1 to 3, is integrally connected to the rear end of drawbar 63 by a vertical post 65, and a socket member 66, similar to socket member 31, is attached to the forward end of the drawbar 63 by bolts 67.

A cross plate 68 integral with the drawbar 63 carries locating pins 70 which fit within holes in a forward wall 71 formed on the frame plate 51 to retain the drawbar in proper alignment with the frame plate when the drawbar is in its retracted position, as shown on FIG. 6 and 7.

Inclined ramps 72 and 73 are formed on the forward lower portions of the shelf walls 60 and 61 to embrace opposite sides of the drawbar 63 and hold it in proper lateral relationship with the frame plate, even when the latter is advanced endwise from its illustrated retracted position.

A removable safety lock pin 74 is passed through coextensive holes in the frame plate 51 and drawbar 63 when the latter is in its retracted position.

When it is desired to couple the towed vehicle 56 to a towing vehicle, one or the other is maneuvered until the socket member 66 is in the general vicinity of the ball member (not shown) of the towing vehicle. Thereafter, the safety pin 74 is removed and the drawbar 63 is advanced to remove the pins 70 from the plate wall 71 during which the pivot slide pin 64 slides over the shelf walls 60 and 61. The drawbar can then be rocked vertically below the ramps 72 and 73 leaving it free to be rocked horizontally about the post 65 and slid endwise to properly align the socket member 66 with the ball member on the towing vehicle. When coupling of the ball and socket members is effected, the weight of the two bar 50 causes the forward end of the frame plate 51 to bear downwardly against the upper edge of the drawbar and thus cause the pivot slide pin 64 to bear downwardly against the shelf walls 60 and 61.

When the towing vehicle is now driven forward, the pin 64 will advance to a forward position in engagement with the frame plate walls 71, and then effectuate alignment of the vehicle 56 until it tracks with the towing vehicle. Thereafter, the towing vehicle is driven rearward toward the towed vehicle until the drawbar 63 reaches its fully retracted position, whereupon the pivot slide pin 64 drops into a position indicated by dotted lines 64A behind the rear ends 75 of the shelf walls 60 and 61 and onto ledges formed on steps 76 and 77 extending from the shelf walls. This establishes a driving connection between the drawbar 63 and the tow bar 50. The safety lock pin 74 may then be reinserted in place.

A safety strap 78 is integrally attached to the walls 57 and 58 at the rear ends of the latter to underlie the drawbar 63 when it is in its retracted position.

From the foregoing it will be evident that I have devised a novel and simple coupling device for towing and towed vehicles in which the vehicles need only to be positioned in the general vicinity of each other and a relatively light drawbar manipulated to precisely align ball and socket elements thereon to effectuate coupling of the vehicles. This enables persons of average, or even below average, strength to couple such vehicles for towing regardless of the size and weight of the towed vehicle.

I claim:

1. Coupling means for coupling a towed vehicle to a towing vehicle in which a ball member is connected to a first one of the vehicles and a socket member is connected to a second one of the vehicles, comprising:
   base means for attachment to said second one of the vehicles, said base means forming a guideway;
   a drawbar slidable along said guideway, said drawbar being integral at one end with said socket member; and
   pivot means at an opposite end of said drawbar relative to said socket member, said pivot means forming a pivot and slide connection with said guideway to permit pivoting and sliding of said drawbar from a retracted position to an advanced position relative to said guideway to thereby permit coupling of the ball and socket members, wherein said pivot means permits the pivoting of said drawbar about said pivot and slide connection in a horizontal direction and in a vertical direction.

2. Coupling means as defined in claim 1 including retaining means for preventing horizontal movement of said drawbar relative to said base means when said drawbar is in said retracted position.

3. Coupling means as defined in claim 2 in which said retaining means includes said pivot means and is engageable with said base means only when said drawbar is in said retracted position to thereby prevent the horizontal movement of said drawbar relative to said base means.

4. Coupling means as defined in claim 3 wherein said guideway comprises a pair of elongate upwardly converging guide walls to receive said drawbar therebetween, said guide walls being spaced apart at their upper edges; and
   said pivot means comprises a pivot member rockable and slidable over said guideway and a post extending between the upper edges of said guide walls, said post being integral at its upper end with said pivot member and integral at its lower end with said drawbar.

5. Coupling means as defined in claim 4 wherein said pivot member comprises a cylindrical member extending transversely over said guideway, 6. Coupling means as defined in claim 5 wherein said retaining means includes a shoulder on at least one of said guide walls positioned to permit said pivot member to engage it when said drawbar is in said retracted position and thereby form a driving connection between said drawbar and said base means.

7. Coupling means as defined in claim 1 wherein said guideway comprises a pair of elongate upwardly converging guide walls extending along the length of said guideway to slidably receive said drawbar therebetween, said guide walls being spaced apart at their upper edges, and which includes:
   horizontally extending shelf walls integral with said side walls along their upper edges; and wherein
   said pivot means comprises a pivot member rockable and slidable on said shelf walls and a pivot post extending between said shelf walls, said post being integral at its upper end with said pivot member and integral at its lower end with said drawbar.

8. Coupling means as defined in claim 7 including notches at the rear of said shelf walls for receiving said pivot member when said drawbar is in said retracted position thereby to form a driving connection between said drawbar and said base means.

9. A coupling device comprising:
   a base member for attachment to a vehicle to be towed, said base member forming a pair of elongate upwardly converging guide surfaces;
   a drawbar adapted for sliding engagement with said guide surfaces;
   means at one end of said drawbar forming a socket for coupling to a ball member on a towing vehicle;
   means at a second end of said drawbar forming a rocking slide connection to said base member to permit sliding movement of said drawbar between advanced and retracted positions along said guide surfaces and for downward rocking movement about said opposite end; and
   means for locking said drawbar to said base member in said retracted position.

10. A coupling device as defined in claim 9 wherein said locking means is effective to lock said drawbar in nesting relationship with said guide surfaces.

11. A coupling device as defined in claim 10 wherein said rocking slide connection permits the swinging of said drawbar from side to side about said opposite end when said drawbar is rocked downward from engagement with said guide surfaces.

12. A coupling device comprising:
   a base member for attachment to a vehicle to be towed, said base member forming an elongate guideway;
   a drawbar positioned for movement along said guideway;
   means at a first end of said drawbar forming a socket for coupling a ball member on a towing vehicle;
   means at a second end of said drawbar forming a rocking slide connection with said guideway to permit movement of said drawbar about a horizontal axis as well as a vertical axis while remaining slidably engaged with the guideway; and
   means for locking said drawbar to said base member in the retracted position.

13. A coupling device as defined in claim 12 wherein said locking means includes a shoulder on said base member; and
   said means forming a rocking slide connection is effective to engage said shoulder when said drawbar is in said retracted position whereby to form a driving connection between said drawbar and said base member.

14. A coupling device as defined in claim 13 including means for preventing rocking of said drawbar relative to said base member when said drawbar is in said retracted position.

15. Coupling means for coupling a towed vehicle to a towing vehicle in which a ball member is connected to a first one of the vehicles and a socket member is connected to a second one of the vehicles, comprising:
   base means for attachment to said second one of the vehicles, said base means forming a guideway;
   a drawbar slidable along said guideway, said drawbar being integral at a first end with said socket member; and
   pivot means at a second end of said drawbar forming a pivot and slide connection with said guideway to permit pivoting and sliding of said drawbar from a retracted position to an advanced position relative to said guideway to thereby permit coupling of the ball and socket members;
   wherein said guideway comprises a pair of elongate upwardly converging guide walls extending along the length of said guideway to slidably receive said drawbar therebetween, said guide walls being spaced apart at their upper edges, and horizontally extending shelf walls integral with said side walls along their upper edges, and wherein said pivot means comprises a pivot member rockable and slidable on said shelf walls and a pivot post extending between said shelf walls, said post being integral at its upper end with said pivot member and integral at its lower end with said drawbar.

16. Coupling means as defined in claim 15 including notches at the rear of said shelf walls for receiving said pivot member when said drawbar is in said retracted position thereby to form a driving connection between said drawbar and said base means.

* * * * *